United States Patent [19]

Ito et al.

[11] Patent Number: 5,480,714
[45] Date of Patent: Jan. 2, 1996

[54] CHIPPING-RESISTANT RESIN MOLDED ARTICLE

[75] Inventors: Toshiyasu Ito; Yasuhiko Ogisu; Shigeyuki Takahashi; Toshiya Uemura, all of Inazawa; Minoru Nohata, Omiya; Ippei Nagaike, Omiya; Shigeru Noguchi, Omiya; Kenjiro Arai, Omiya, all of Japan

[73] Assignee: Toyoda Gosei Co., Ltd., Aichi, Japan

[21] Appl. No.: 44,507

[22] Filed: Apr. 9, 1993

[30] Foreign Application Priority Data

| Apr. 28, 1992 | [JP] | Japan | 4-109487 |
| Apr. 28, 1992 | [JP] | Japan | 4-109488 |
| Apr. 28, 1992 | [JP] | Japan | 4-109489 |
| Apr. 28, 1992 | [JP] | Japan | 4-134438 |
| Apr. 28, 1992 | [JP] | Japan | 4-134439 |

[51] Int. Cl.⁶ ............................................. B32B 5/16
[52] U.S. Cl. ............................. 428/324; 428/325; 428/328
[58] Field of Search .......................... 428/313.3, 313.5, 428/324, 325, 328

[56] References Cited

U.S. PATENT DOCUMENTS

| 4,359,504 | 11/1982 | Troy | 428/403 |
| 4,465,715 | 8/1984 | Manabe et al. | 427/444 |
| 4,590,235 | 5/1986 | Troy | 524/439 |
| 4,971,841 | 11/1990 | Panush et al. | 427/407.1 |

FOREIGN PATENT DOCUMENTS

| 0423951 | 4/1991 | European Pat. Off. . |
| 3310465 | 10/1983 | Germany . |
| 3339683 | 5/1985 | Germany . |
| 3730634 | 3/1989 | Germany . |
| 4014212 | 11/1991 | Germany . |

*Primary Examiner*—George F. Lesmes
*Assistant Examiner*—Christopher W. Raimund
*Attorney, Agent, or Firm*—Cushman Darby & Cushman

[57] ABSTRACT

A resin molded article comprising a main body of molded material, an intermediate coating layer comprising scaly pieces of matter and a resin constituent composed of one, or a plurality of layers, and a finish coating layer formed on the outermost surface of the intermediate coating layer. The resin molded article of the present invention provides improved resistance to chipping.

4 Claims, 9 Drawing Sheets

5,480,714

CHIPPING-RESISTANT RESIN MOLDED ARTICLE

BACKGROUND OF THE INVENTION

1. Field of the Invention

The present invention relates to a resin molded article used as, for example, an external automotive trim. More particularly, it relates to a chipping-resistant resin molded article such as, for example, one which may be attached to the undercarriage of an automobile, such as a rocker molding, a side mud guard or the like.

2. Description of Relevant Art

In improving the efficiency in fuel consumption of an automobile, the reduction of the weight of the body itself is effective. In the weight reduction of the body of an automobile, there is a predominant tendency that plastic or aluminum is used as a material for the body in place of an iron plate, i.e., a conventional material. Owing to the problem of recycling, employment of polypropylene composites (PP composites) is increased in parts of the so-called undercarriage, such as bumpers, rocker moldings, side mud guards, etc.

In a resin molded article such as a rocker molding, a coating layer, such as a primer and a top coat, conventionally used for improving the appearance and protecting the molded article is formed on the surface of the main body of the molded article which is most often made of a polypropylene (PP) or a urethane material. The conventional coating layer is composed mainly of a polyurethane type resin and has a thickness of approximately 30–50 μm.

During the operation of an automobile, the above described parts of the body undercarriage commonly receive an impact of pebbles or gravel which is sent flying by the automobile. Therefore, peeling of the coating of the undercarriage parts or damage to the material itself may be caused, so that their appearance tends to be greatly injured. This common problem is generally referred to as chipping caused by flying stones, however, one skilled in the art will appreciate that such damage may be caused by other projectiles, of which stones are only one example.

In the case of prior art, when a flying stone collides with the previously described coating layer, at a high speed, the conventional coating layer cannot completely resist the impact force and the flying stone partly reaches the main body of the molded article. Consequently, the coating is partly peeled, or the main body of the molded article is injured by the flying stone. Thus, the appearance quality of the resin molded article may be deteriorated.

For the undercarriage, the urethane material is better than polypropylene but expensive and not recyclable.

For coping with these and similar disadvantages conventional procedures have entailed increasing the thickness itself of the coating layer. But, since formation of a coating layer having a thickness larger than a usually predetermined thickness is technically difficult, and such an increased thickness increases costs greatly, such conventional remedies are not generally feasible.

SUMMARY OF THE INVENTION

It is an object of the present invention to provide a resin molded article which has an enhanced impact resistance to damage, such as chipping, without increasing the thickness of the coating layer and the number of the layers as compared to conventional coating layers.

In one embodiment, the present invention provides a resin molded article comprising a main body of molded material, an intermediate coating layer comprising a resin constituent composed of one layer, or a plurality of layers, which is formed on the outer surface of the main body of molded material, and a finish coating layer formed on the outermost surface of the intermediate coating layer, wherein a large number of spherical pieces of matter are present in the intermediate coating layer.

In another embodiment, the present invention provides a resin molded article comprising a main body of molded material, an intermediate coating layer comprising a resin constituent composed of one layer, or a plurality of layers, which is formed on the outer surface of the main body of molded material, and a finish coating layer formed on the outermost surface of the intermediate coating layer, wherein a large number of fibrous pieces of matter are present in the intermediate coating layer.

In yet another embodiment, the present invention provides a resin molded article comprising a main body of molded material, coated on its exposed surface by a coating layer comprising an intermediate coating layer which comprises a resin constituent composed of one layer, or a plurality of layers, which is formed on the surface of the main body of molded material and a finish coating layer formed on the outermost surface of the intermediate coating layer, wherein a large number of scaly pieces of matter are present in the intermediate layer.

PREFERRED EMBODIMENTS OF THE INVENTION

Figure 1:
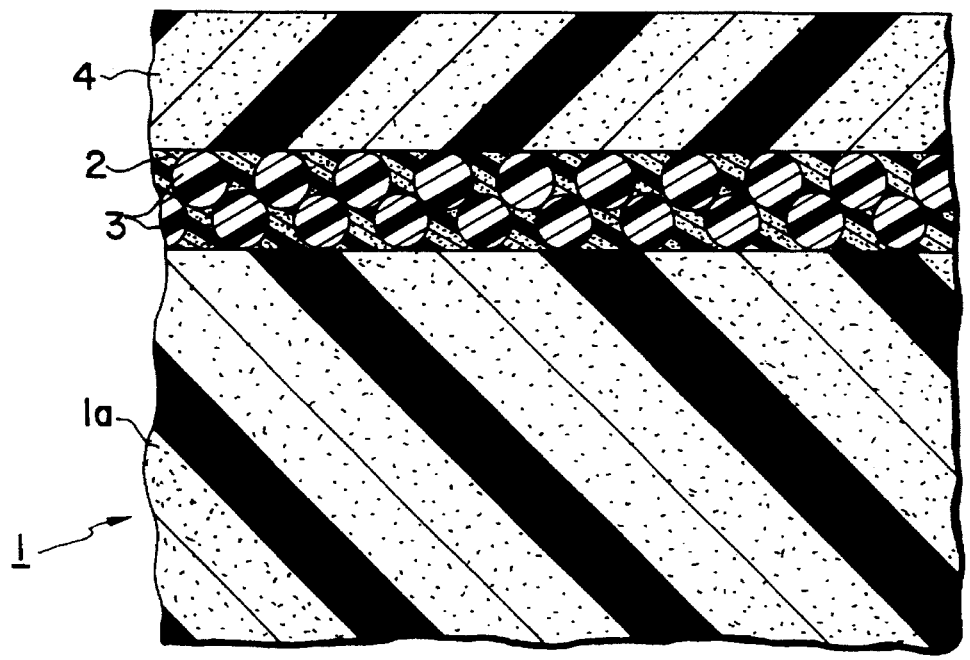
FIG. 1 is a partially sectional view of a rocker molding obtained according to one embodiment of the present invention in which spherical pieces of matter are present in the intermediate coating layer.

The spherical piece of matter used in the present invention includes fine particles, beads and the like of urethane resins, acrylic resins, benzoguanamine resins, polyamides, polyesters, vinyl resins, silica, glass, etc. These spherical pieces of matter may be used singly or as a mixture thereof. The spherical piece of matter may be hollow in view of extra shock absorbing ability, etc.

The particle diameter of the spherical piece of matter is preferably not more than 40 µm and not less than 1 µm.

The fibrous piece of matter used in the present invention includes carbon fiber, rock wool, cellulose fibers (AVICEL, KC-FLOCK, etc.), glass fiber, calcium sulfate whisker, potassium titanate whisker, fibrous magnesium compounds, wollastonite, polyester fibers, polyamide fibers, aramide fiber, poly(vinyl alcohol) fibers, nylon fibers, etc.

Specifically, there can be used FRANKLIN FIBER (calcium sulfate whisker) manufactured by U.S. Gypsum (fiber diameter: 2 µm, fiber length: 50 to 60 µm), TISMO (calcium titanale whisker) manufactured by Otsuka Chemical Co., Ltd. (diameter: 0.2 to 0.5 µm, length: 10 to 20 µm), HT-30 (calcium titanate whisker) manufactured by Titan Kogyo, K.K. (diameter: 0.3 to 0.7 µm, length: 5 to 30 µm), MOSHIGE (magnesium fiber) manufactured by Ube Industries, Ltd. (diameter: 1 µm or less, length: 10 to 100 µm), LAPINUS ROCKFIL manufactured by LAPINUS (diameter: 5 µm or less, length: 100 µm), KYNOL FIBER KF02BT (carbon fiber) manufactured by Nihon Kynol Inc. (diameter: 14 µm, length: 200 µm), KURECA CHOP M-101S (carbon fiber) manufactured by Kureha Chemical Industry Co., Ltd. (diameter: 12.5 µm, length: 130 µm), Glass Powder P325 manufactured by Asahi Fiber Glass Co., Ltd. (40 µm or less), KC-FLOCK W-400 (cellulose fiber) manufactured by Sanyo-Kokusaku Pulp Co., Ltd. (diameter: 15 to 20 µm, length: 20 to 80 µm), AVICAL PH-M15 (cellulose fiber) manufactured by Asahi Chemical Industry Co. (5 to 15 µm).

These fibrous pieces of matter may be used singly or as a mixture thereof.

The diameter of the fibrous piece of matter is not more than 25 µm and not less than 0.1 µm. It is preferably not more than 20 µm and not less than 0.1 µm for assuring a workability (e.g. sprayability) and an appearance quality (e.g. surface roughness).

The fiber length of the fibrous piece of matter is not more than 5 mm and not less than 1 µm. It is preferably not more than 200 µm and not less than 1 µm for assuring the workability and the appearance quality.

The scaly piece of matter used in the present invention comprises mica, aluminum, stainless steel, nickel, glass, talc or the like.

As the scaly piece of matter, there may be used either one of such pieces of matter or a mixture of them.

The particle diameter of the scaly piece of. matter is not more than about 300 µm and not less than about 1 µm. Its aspect ratio (i.e. average particle diameter/average particle thickness) is preferably 3 to 150.

The adding proportion of the spherical pieces of matter or the fibrous pieces of matter should be not more than 60 wt % and not less than 5 wt % based on the weight of the resin constituent which constitutes the intermediate coating layer. When the adding proportion of the spherical or fibrous pieces of matter is less than 5 wt %, the impact-absorbing ability is not adequate. When the adding proportion of the spherical or fibrous pieces of matter is more than 60 wt %, formation of the coating layer becomes difficult.

The adding proportion of the scaly pieces of matter should be not more than 60 wt % and not less than 2 wt % based on the weight of the resin constituent which constitutes the intermediate coating layer. When the proportion of the scaly pieces of matter added to form the intermediate layer is less than 2 wt %, the impact-absorbing ability is not acceptable. When the proportion of the scaly pieces of matter added is more than 60 wt %, formation of the coating layer becomes difficult.

When a large number of the spherical pieces of matter or the scaly pieces of matter are added to the intermediate coating layer, collision of a flying object, such as a stone, with the resin molded article imparts a great impact force to some of the spherical or scaly pieces of matter at a portion of the intermediate coating layer at which the flying stone collides, but the impact force is transmitted and distributed to the spherical or scaly pieces of matter which are adjacent to or in the vicinity of the pieces present in the impact area, whereby the destructive force is dispersed. Therefore, only a weak impact force is applied to the unit area of the main body of molded article. Accordingly, the coating layer composed of the intermediate coating layer and the finish coating layer is hardly peeled by the impact force applied by the flying stone, and the main body of molded article is hardly injured by the impact force. Thus, there is less deterioration of the appearance quality of the molded article as compared to conventional coatings.

When a large number of fibrous pieces of matter are added to the intermediate coating layer, collision of a flying object, such as a stone, with the resin molded article applies a great impact force to some of the fibrous pieces of matter at a portion of the intermediate coating layer at which the flying stone collides, but the impact area of the resin (the matrix) according to the present invention is reinforced by the fibrous pieces of matter, so that the cohesive force of the matrix is increased. Therefore, even when a great impact force is applied, the coating itself can withstand the impact force. Accordingly, the coating layer composed of the intermediate coating layer and the finish coating layer is relatively undamaged by the impact force applied by the flying force, reducing peeling and chipping, and the injury to the main body of molded article is reduced. Thus, deterioration of the appearance quality of the molded article is substantially reduced.

As described above, the resin molded article of the present invention comprises a main body of a molded article and a coating layer comprising an intermediate coating layer and a finish coating layer, wherein the above-described spherical pieces of matter, fibrous pieces of matter or scaly pieces of matter are contained in the intermediate coating layer.

One skilled in the art will appreciate that the molded articles according to the present invention may include, for example, parts of the undercarriage of an automobile, e.g. bumpers, rocker moldings, and side mud guards. These molded articles may be made of polypropylene, polyurethane, polypropylene composite or the like as may be required.

The intermediate coating layer may be formed as a primer layer on the surface of the main body of the molded article. It may be composed of either one layer or a plurality of layers.

The intermediate coating layer imparts resistance to chipping to the resin molded article by virtue of the spherical pieces of matter, the fibrous pieces of matter or the scaly pieces of matter, which are contained in the intermediate coating layer.

For improving the oil resistance, moisture resistance, weather resistance and the like in addition to performance characteristics such as resistance to chipping, the intermediate coating layer is formed using the above-mentioned coating composition as primer, and a conventional finish coating layer may be formed on the intermediate coating layer.

The present invention is illustrated in detail with reference to the following Examples which should not be construed as limiting the scope of the present invention.

EXAMPLE 1

One example in which the resin molded article of the present invention was embodied into a rocker molding for automobile is explained below with reference to FIGS. 1 to 4.

FIG. 1 is a partially sectional view of the rocker molding 1 of the present example. The rocker molding, 1, is composed of a main body of molding, 1a, as the main body of the molded article, a primer layer, 2, formed as an intermediate coating layer on the surface of the main body of the molding, 1a, and a finish coating layer formed on the surface of the primer layer, 2.

The primer layer, 2, is composed of a resin constituent consisting of an amine-modified acrylic resin, a hard resin, pigments, additives, an epoxy resin and a chlorinated polypropylene, and a large number of urethane beads, 3, added in a proportion of not more than 60 wt % and not less than 5 wt % based on the weight of the resin constituent. The primer layer, 2, has a thickness of 25 µm. The urethane beads have a particle diameter of 13 to 16 µm (ARTPEARL C-400, a trade name, mfd. by Negami Chemical Industrial Co., Ltd.). The particle diameter of the urethane beads according to the present invention are preferably not greater than 40 µm so that workability of the components and the appearance of the final product are not compromised.

The finish coating layer, 4, is formed to a thickness of 35 µm by application and drying of a finish coating fluid (SOFLEX 200, a trade name of a thermo-setting urethane paint mfd. by Kansai Paint Co., Ltd.).

The primer layer, 2, and finish coating layer, 4, are formed in the following manner. First, there is prepared a liquid primer composed of 100 parts by weight of a liquid, A, consisting of the amine-modified acrylic resin, the hard resin, the pigments, the additives, a large number of the urethane beads, 3, and a solvent, 50 parts by weight of a liquid, B, consisting of the epoxy resin, the chlorinated polypropylene and a solvent, and 100 parts by weight of an aromatic thinner. The primer is applied on the surface of the main body of the molding, 1a. Subsequently, the finish coating fluid is applied on the primer and dried, followed by baking at a high temperature of 85° C. for 40 minutes. Thus, the primer layer, 2, and the finish coating layer, 4, are laminated on the main body of the molding, 1a, whereby the desired rocker molding, 1, is obtained.

Figure 2:
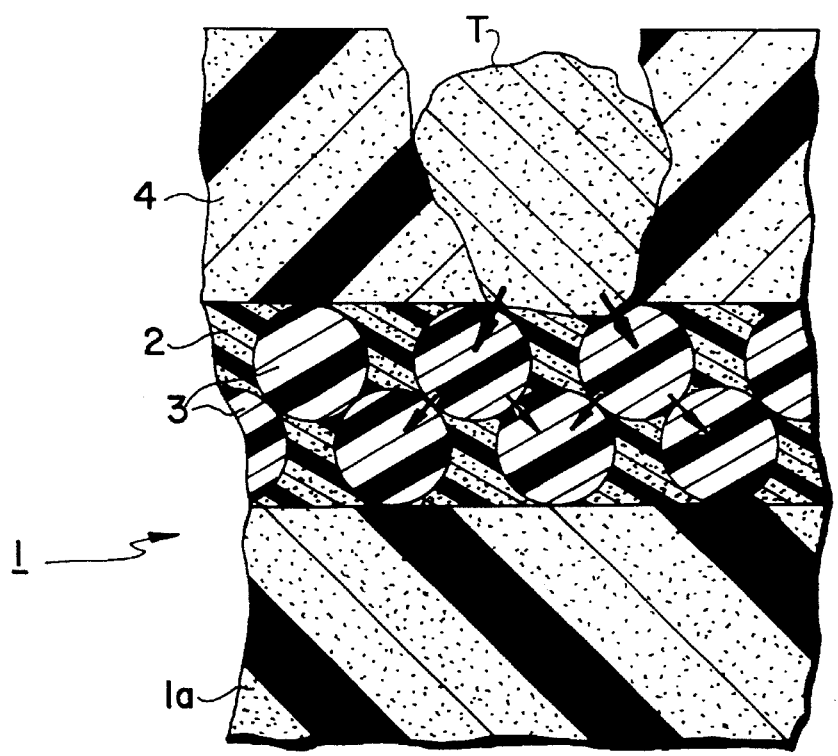
FIG. 2 is an enlarged sectional view showing a state of collision of an object on impact, such as a flying stone, with the rocker molding in the embodiment of the present invention depicted in FIG. 1.

When the rocker molding, 1, having the structure described above is attached to an automobile and the automobile is driven in practice, a flying stone T, in some cases, collides with the rocker molding, 1, at a high speed, destroys a part of the finish coating layer, 4, and reaches the primer layer, 2, as shown in FIG. 2. In the case where the molding has been prepared according to the present invention, the primer layer, 2, contains a large number of the urethane beads, 3, and hence, although a great impact force is applied to some of the urethane beads, 3, at the area of impact on the primer layer, 2, at which the flying stone T collides, the impact force is transmitted to and dispersed by the urethane beads, 3, adjacent to or in the vicinity of the beads present in the area of impact. Therefore, only weak an impact force is applied to the unit area of the main body of rocker molding, 1a. Accordingly, the coating layer composed of the primer layer, 2, and the finish coating layer, 4, is left relatively undamaged by the impact force applied by the flying stone T, and the main body of rocker molding, 1a, is damaged less than if conventional coating layer wave used. Thus, the rocker molding according to the present invention is rendered. resistant to chipping. Consequently, there is less deterioration of the appearance quality of the rocker molding, 1, by the collision of the flying objects, such as stones.

In order to confirming resistance to chipping provided by the instant invention, the following collision test was carried out by varying the amount of the urethane beads, 3, added to the primer layer, 2. The following 7 proportions were tested: 0 wt %, 2 wt %, 5 wt %, 10 wt %, 20 wt %, 40 wt % and 60 wt % based on the weight of the resin constituent which constituted the primer.

Figure 3:
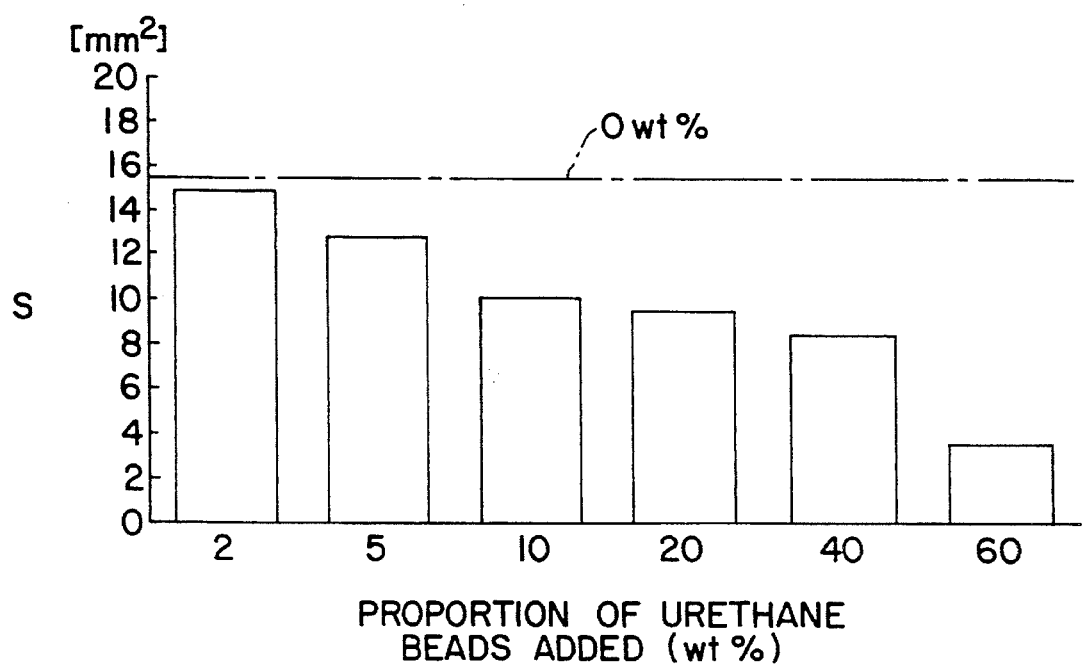
FIG. 3 is a graph showing the total area ($mm^2$) of broken portions of the coating layer of the rocker molding surface versus the wt % of added spherical pieces of matter in the intermediate coating layer, for the case where flying stones were projected at an angle of 90°.
Figure 4:
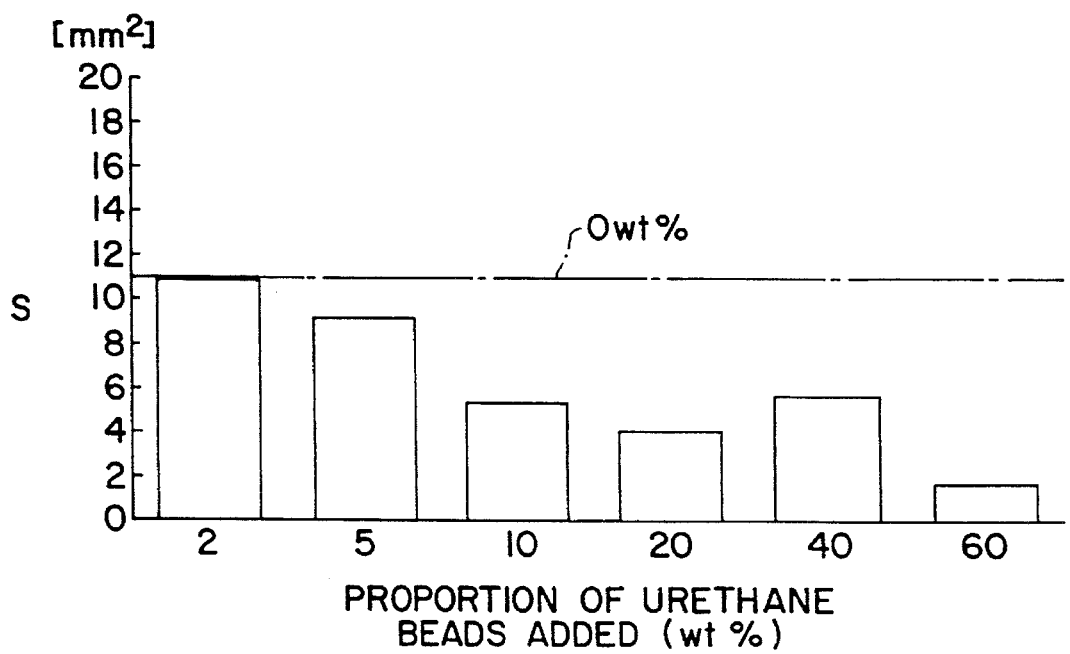
FIG. 4 is a graph showing the total area ($mm^2$) of broken portions of the coating layer of the rocker molding surface versus the wt % of added spherical pieces of matter in the intermediate coating layer, for the case where flying stones were projected at an angle of 20°.

In this flying-stone collision test, 500 g of basalt crushed stones (No. 6) of 4.8 to 8.0 mm in size were used to simulate flying stones. In an atmosphere at −20° C., a test piece (75×110 mm) of each of the various rocker moldings, 1, obtained in the manner described above, was attached to a flying-stone tester (a gravelometer), and the flying stones were allowed to collide with the test piece at an angle of projection of 90° or 20° and at an injection pressure of 0.4 MPa. The total area S (mm$^2$) of broken portions of the coating per 10,000 mm$^2$ of the surface of the rocker molding, 1, was measured by picture processing. The measurement results obtained at angles of projection of 90° and 20° are shown in FIGS. 3 and 4, respectively. In each of FIGS. 3 and 4, the alternate long and short dash line shows the total area S (mm$^2$) of broken portions of the coating in the case where the proportion of the added urethane beads, 3, was 0 wt %.

As is clear from these figures, in the case of both the 90° projection (FIG. 3) and the 20° projection (FIG. 4), the higher the proportion of the urethane beads which were added, the smaller the resulting total area (mm$^2$) of broken portions of the coating, when the proportion added was 5 wt % or more, based on the weight of the resin constituent of the primer.

In the rocker molding, 1, of the present example, the urethane beads, 3, are added to the primer layer, 2, in a proportion of not more than 60 wt % and not less than 5 wt % based on the weight of the resin constituent which constitutes said layer, and hence even when the flying stone T collides with the rocker molding, 1, the coating is hardly peeled. Thus, little damage to the main body of rocker molding, 1a, is produced.

The scope of the present invention is not limited by the above example.

One skilled in the art will appreciate that although the urethane beads, 3, are used in the above example, beads made of an acrylic resin, a melamine resin or the like as described above. Hollow spherical pieces of matter may also be used. Further, although the intermediate coating layer is composed of one layer, i.e., the primer layer, 2, in the above example, the intermediate coating layer according to the present invention may be composed of a plurality of layers.

EXAMPLE 2

Another example in which the resin molded article of the present invention was embodied into a rocker molding for automobile is explained below with reference to FIGS. 5 to 11.

Figure 5:
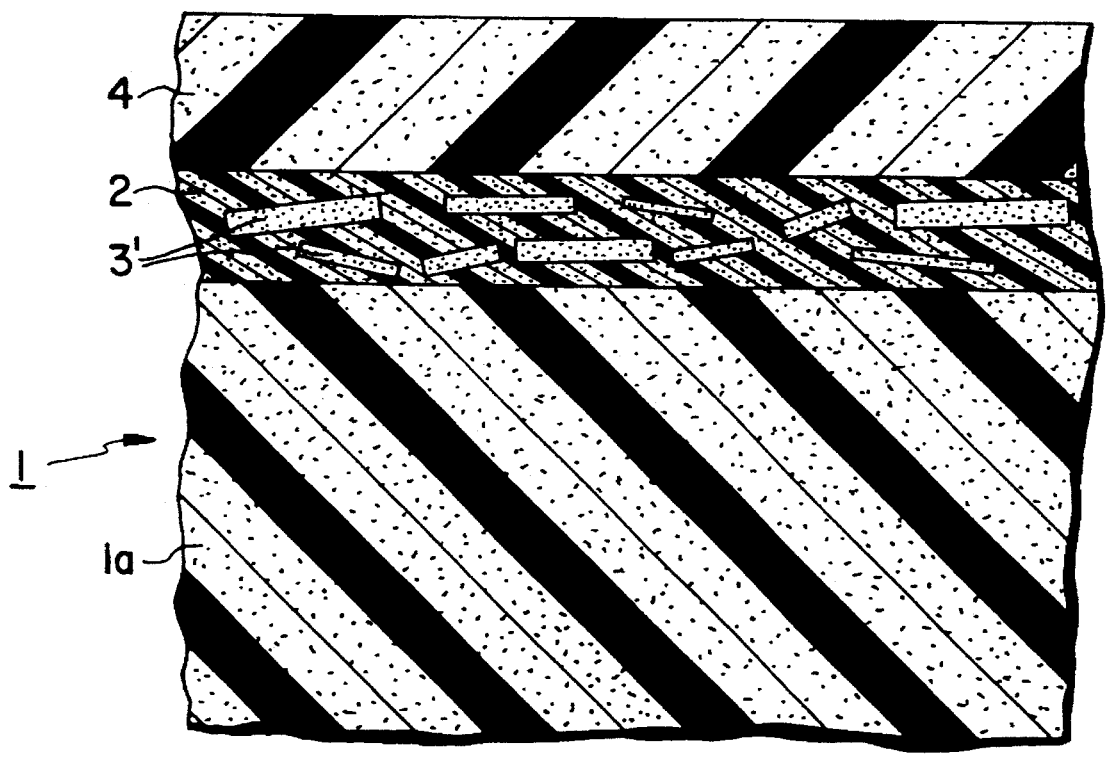
FIG. 5 is a partially sectional view of a rocker molding obtained in another embodiment of the present invention wherein fibrous pieces of matter are present in the intermediate coating layer.
Figure 6:
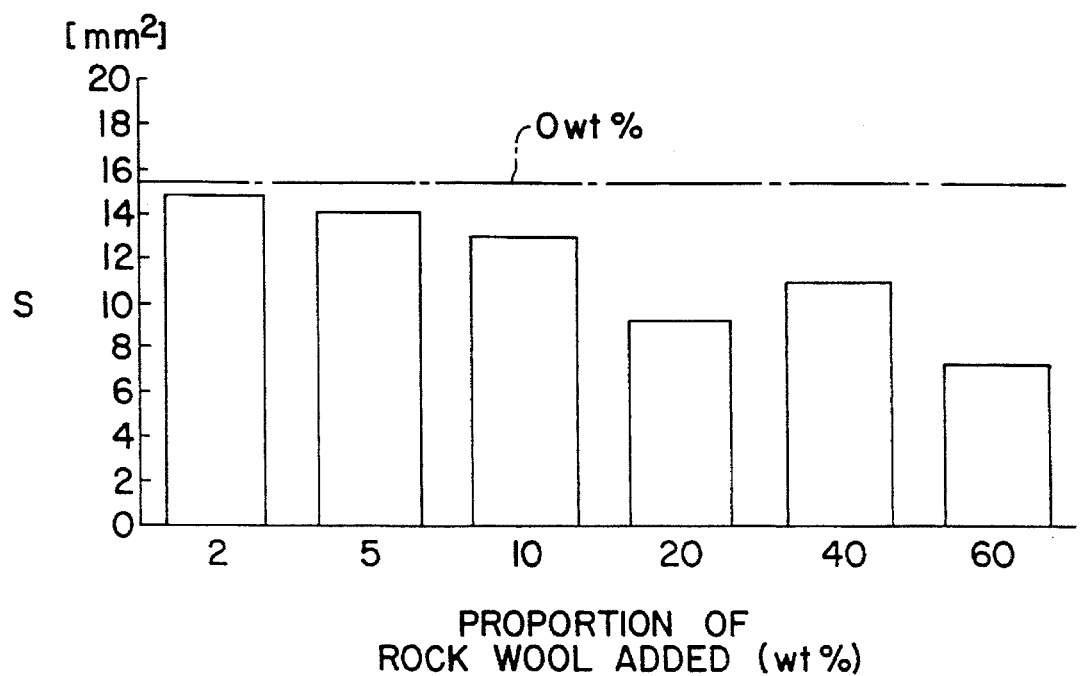
FIG. 6 is a graph showing the total area ($mm^2$) of broken portions of the coating layer of the rocker molding surface versus the wt % of the added fibrous pieces in the intermediate coating layer for the case of projection of flying stones at an angle of 90°.
Figure 7:
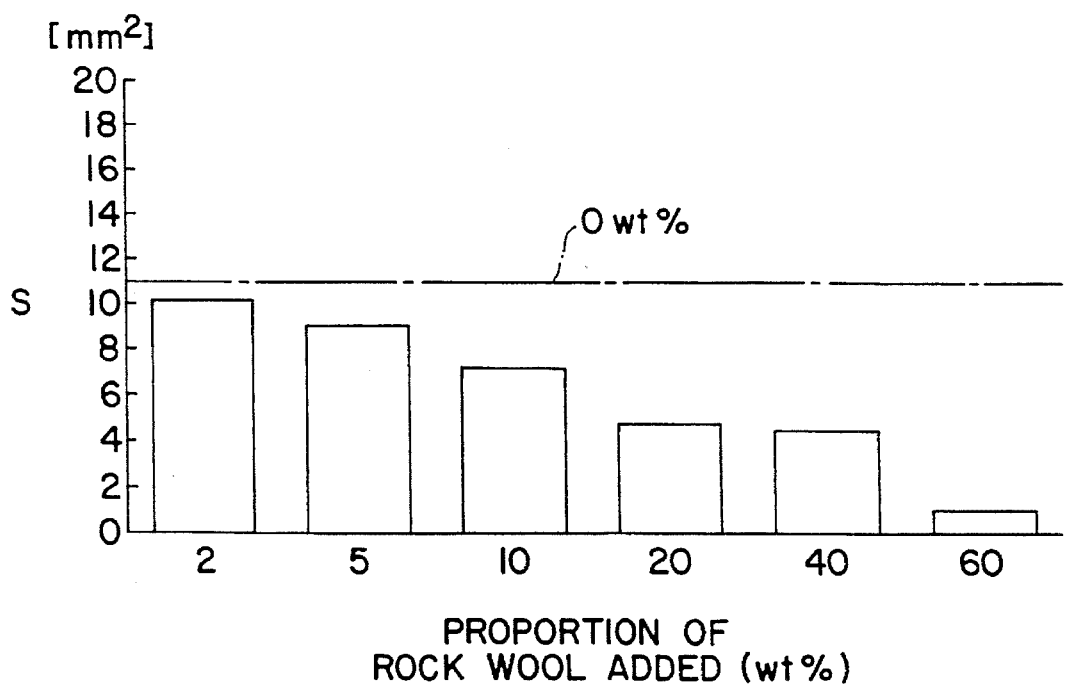
FIG. 7 is a graph showing the total area ($mm^2$) of broken portions of the coating layer of the rocker molding surface versus the wt % of the added fibrous pieces in the intermediate coating layer for the case of projection of flying stones at an angle of 20°.
Figure 8:
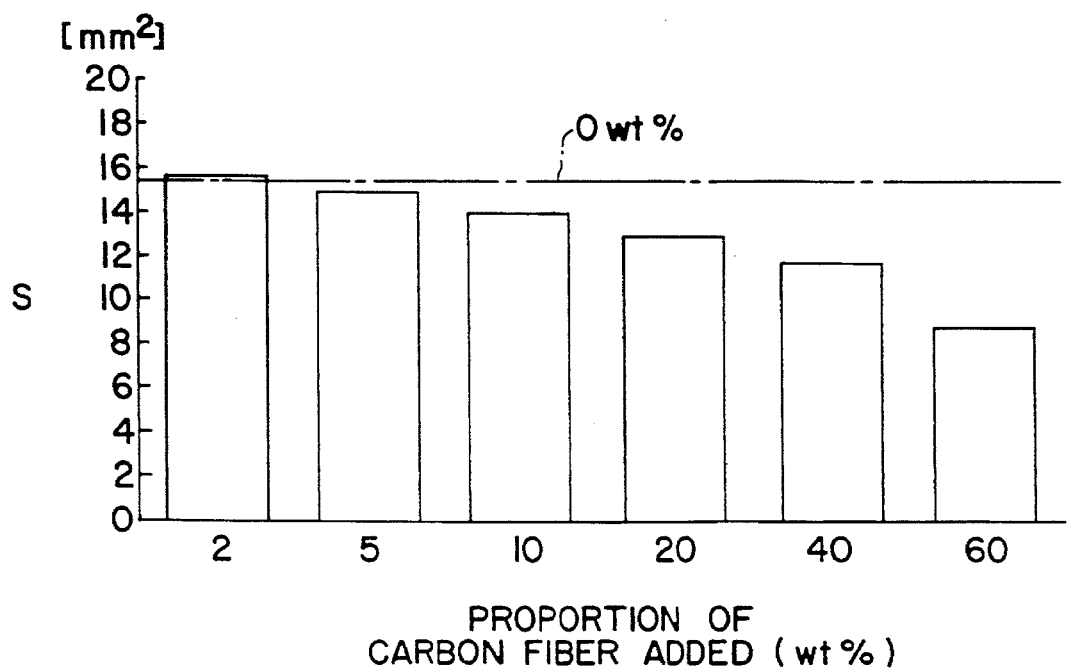
FIG. 8 is a graph showing the total area ($mm^2$) of broken portions of the coating layer of the rocker molding surface versus the wt % of added carbon fiber in the intermediate coating layer for the case of projection of flying stones at an angle of 90°.
Figure 9:
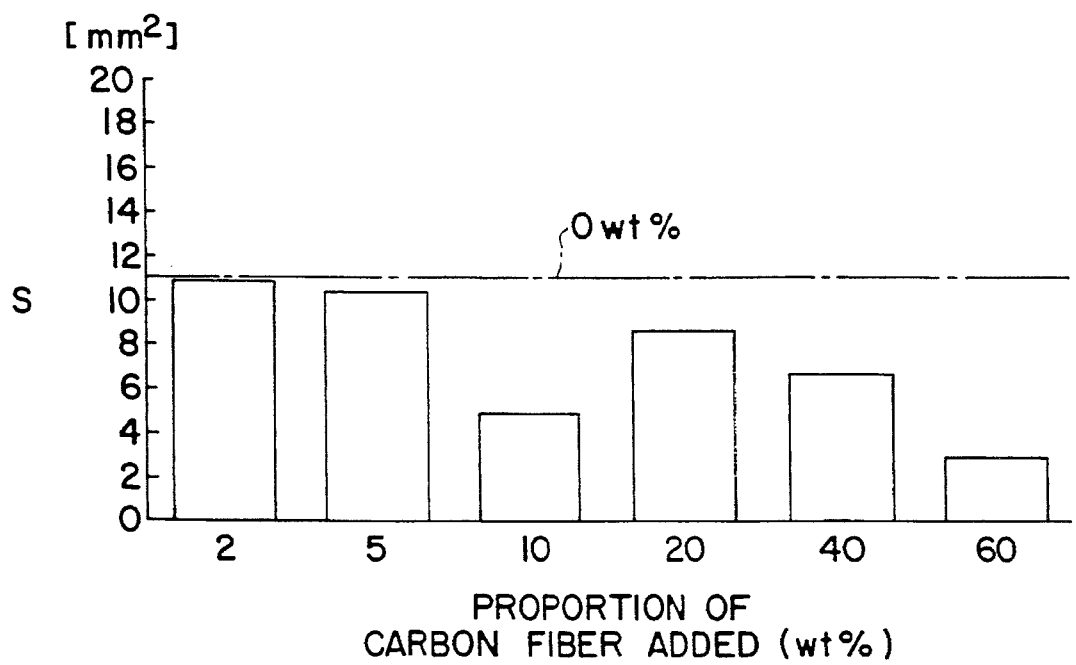
FIG. 9 is a graph showing the total area (mm²) of broken portions of the coating layer of the rocker molding surface versus the wt % of added carbon fiber in the intermediate coating layer for the case of projection of flying stones at an angle of 20°.
Figure 10:
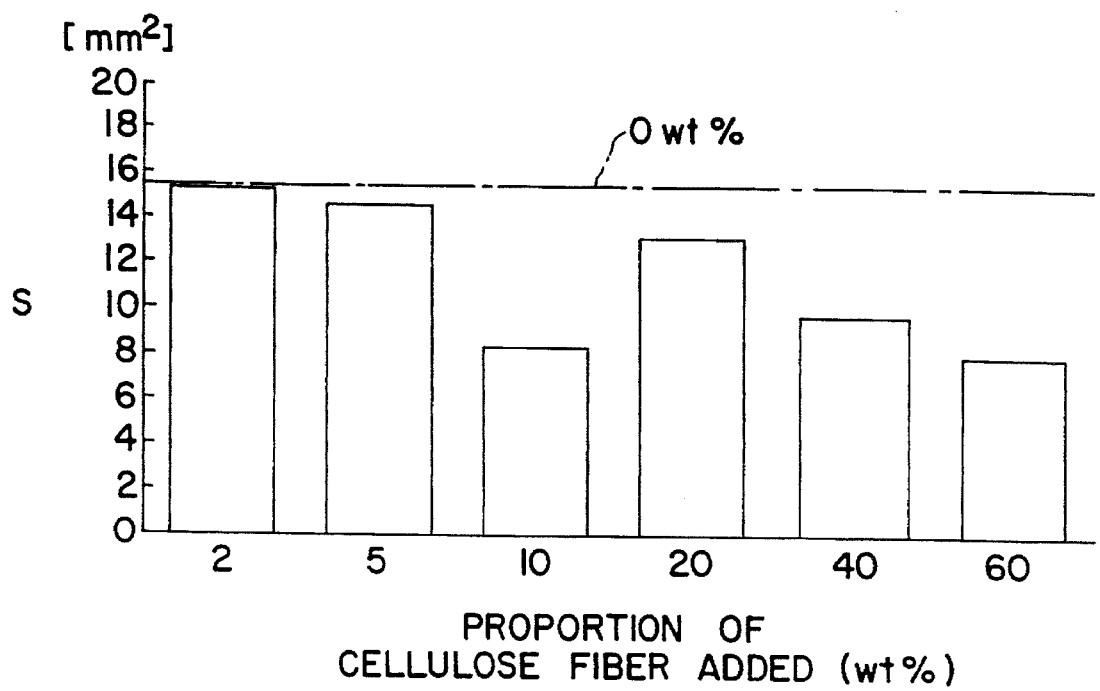
FIG. 10 is a graph showing the total area (mm²) of broken portions of the coating layer of the rocker molding surface versus the wt % of added cellulose fiber in the intermediate coating layer for the case of projection of flying stones at an angle of 90°.
Figure 11:
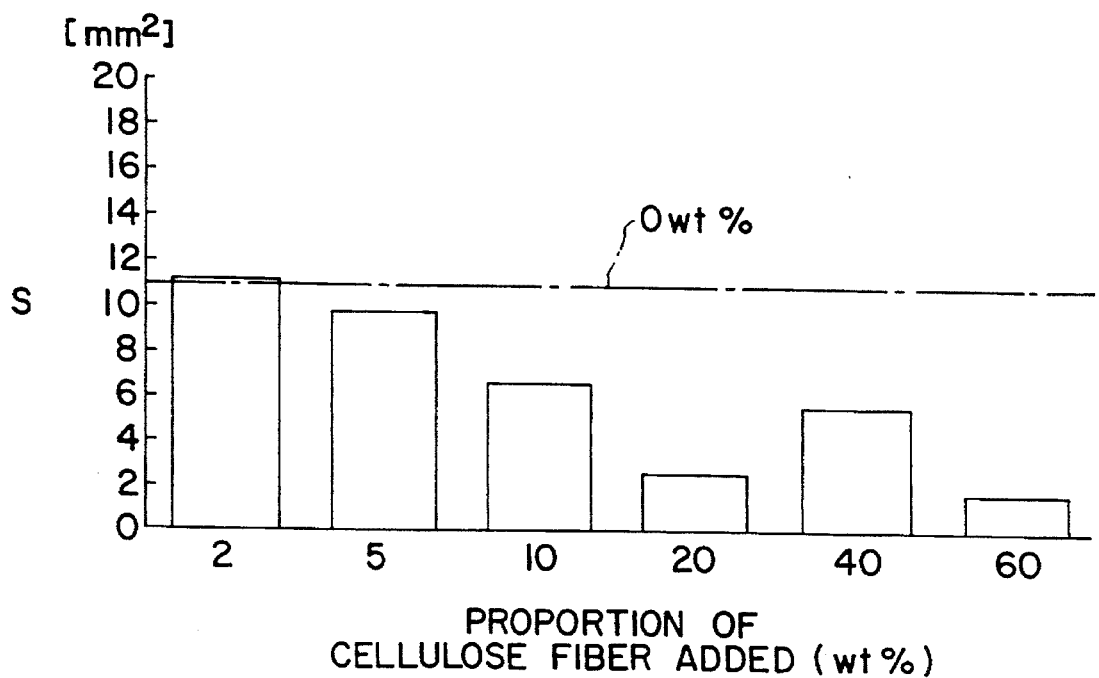
FIG. 11 is a graph showing the total area (mm²) of broken portions of the coating layer of the rocker molding surface versus the wt % of added cellulose fiber in the intermediate coating layer for the case of projection of flying stones at an angle of 20°.

FIG. 5 is a partially sectional view of the rocker molding, 1, of the present example. The rocker molding, 1, comprises a main body of the molding, 1a, as the main body of the molded article, a primer layer, 2, formed as an intermediate coating layer on the surface of the main body of the molding, 1a, and a finish coating layer, 4, formed on the surface of the primer layer, 2.

The primer layer, 2, and the finish coating layer, 4, are formed on the surface of the main body of the molding, 1a, in the same manner as in Example 1 except that fibrous pieces of matter, 3', are used in place of the previously demonstrated urethane beads.

When the rocker molding, 1, having the structure described above is attached to an automobile and the automobile is driven in practice, a flying object, such as a stone, may collide with the rocker molding, 1, at a high speed, threatening the destruction of a part of the finish coating layer, 4, and possibly the primer layer, 2. In the present case, however, the primer layer, 2, contains a large number of the fibrous pieces of matter, 3', which ultimately protect the molded article from damage. Although a great impact force is applied to some of the fibrous pieces of matter, 3', at a portion of the primer layer, 2, at which such a flying stone collides, the primer layer, 2, is reinforced by the fibrous pieces of matter, 3', so that the cohesive force of the resin (the matrix) is increased. Therefore, the coating layer composed of the primer layer, 2, and the finish coating layer, 4, is hardly peeled by the impact force applied by such a flying stone, and the main body of rocker molding, 1a, is hardly injured. Thus, the rocker molding is made resistant to chipping. Consequently, there is less deterioration of the appearance quality of the rocker molding, 1, when impacted by damaging objects, such as the collision of flying stones.

In order to confirm the above-described resistance to chipping, the kind of the fibrous pieces of matter, 3', added to the primer layer, 2, and the amount thereof were varied as follows. As the fibrous piece of matter, 3', there was used each of rock wool (LAPINUS RACKFIL RF4103, a trade name, mfd. by LAPINUS; fiber diameter 5 to 10 μm, fiber length 20 to 170 μm), carbon fiber (M-101S, a trade name, mfd. by Kureha Chemical Industry Co., Ltd.; fiber diameter 14.5 μm, fiber length 130 μm), carbon fiber (M-1009F, a trade name, mfd. by Kureha Chemical Industry Co., Ltd.; fiber diameter 14.5 μm, fiber length 70 μm), and cellulose fiber (AVICEL PH-M15, a trade name, mfd. by Asahi Chemical Industry Co.; fiber diameter 15 μm). The fiber diameter and fiber length of the fibrous piece of matter, 3', are preferably 1 to 20 μm and 10 to 200 μm, respectively, from the viewpoint of workability and assurance of the appearance quality. The following 7 proportions were tested: 0 wt %, 2 wt %, 5 wt %, 10 wt %, 20 wt %, 40 wt % and 60 wt % based on the weight of the resin constituent which constituted the primer.

A flying-stone collision test was carried out in the same manner as detailed in Example 1.

The measurement results obtained are shown in FIGS. 6 to 11. In each of these figures, the alternate long and short dash line shows the total area S (mm$^2$) of broken portions of the coating in the case where the proportion of added fibrous pieces of matter, 3, was 0 wt %.

As is clear from these figures, in the case of both the 90° projection and the 20° projection, the higher the adding proportion of the fibrous pieces of matter which were added, the smaller the total area S (mm$^2$) of the coating which was damaged, when the adding proportion was 5 wt % or more based on the weight of the resin constituent of the primer.

In the rocker molding, 1, of the present invention, the fibrous pieces of matter, 3', are added to the primer layer, 2, in a proportion of not more than 60 wt % and not less than 5 wt % based on the weight of the resin constituent which constitutes the primer layer, and hence, even when a flying object, such as a stone collides with the rocker molding, 1, the coating sustains only slight damage, such as peeling. Thus, damage to the main body of rocker molding, 1a, may be reduced.

One skilled in the art will appreciate that the present invention is not limited by the above example.

Although each of the rock wool, carbon fibers and cellulose fiber was used in the above example, fibers such as polyamide fibers, aramide fibers, poly(vinyl alcohol) fibers, etc. may also be used. Further, although the intermediate coating layer was composed of one layer, i.e., the primer layer, 2, in the above example, the intermediate coating layer of the present invention may be composed of a plurality of layers without departing from the scope of the instant invention.

EXAMPLE 3

Into a reactor were charged 80 parts of toluene, 20 parts of isobutanol, 6 parts of dimethylaminoethyl methacrylate, 40 parts of methyl methacrylate, 20 parts of styrene, 20 parts of butyl acrylate, 20 parts of butyl methacrylate, 14 parts of n-butyl methacrylate, 1 part of n-dodecylmercaptan and 1 part of azobisisobutyronitrile. They were stirred at 80° C. for 2 hours. Then, 0.2 part of azobisisobutyronitrile was added 5 times at 2-hour intervals, and polymerization was completed in 16 hours. Thus, there was produced an acrylic copolymer resin solution for rigid product grade which had a glass transition temperature (Tg) of 70° C.

To 100 parts of the acrylic copolymer were added 20 parts of rock wool (LAPINUS ROCKFIL RF4103, mfd. by LAPINUS) and 1.0 part of a suspending and orientation-improving agent (DISPARLON 6900-20X, mfd. by Kusumoto Chemical Ltd.) with stirring by means of a dissolver, to prepare a liquid, A.

On the other hand, 100 parts of a chlorinated polyolefin resin (HARDLEN 15L, mfd. by Toyokasei, Kogyo Co., Ltd.), 10 parts of an epoxy compound (DENACOL Ex421, mfd. by Nagase Co., Ltd.) and 100 parts of toluene were stirred together to prepare a liquid, B.

The liquid, A, and the liquid B were mixed in a ratio of 2:1 (by weight), and 4 parts of toluene, 40 parts of xylene and 20 parts of cyclohexane were added to adjust the viscosity of the resulting mixture so that the time measured by means of a Ford cup No. 4 might be 13 to 15 seconds. The coating fluid thus obtained was applied by spraying on a PP composite material (PP resin/talc/EPDM resin), dried by heating at 60° C. for 20 minutes, and then allowed to stand at room temperature (20° C.) for 10 to 30 minutes to form a primer layer of 25 μm in thickness.

Then, a finish coating fluid (SOFLEX 200, mfd. by Kansai Paint Co., Ltd.) was applied on the primer layer, and dried and baked at 85° C. for 40 minutes to form a finish coating layer of 40 μm in thickness.

The adhesive properties of the whole coating to the PP composite material, which were measured by a peel test and a checkers tape test, were satisfactory.

The PP composite material on which the primer layer and the finish coating layer had been formed was subjected to the chipping test described below. Consequently, the total area of broken portions of the coating surface of the coated PP composite material was 5 to 10 mm$^2$ per 10,000 mm$^2$ of the coating surface.

Chipping test

As flying stones, 500 g of basalt crushed stones No. 6 (size: 4.8 to 8.0 mm) were used. In an atmosphere at −20° C., a test piece was attached to a flying-stone tester (a gravelometer), and the aforesaid flying stones were allowed to collide with the test piece at an angle of projection of 90° and a projection pressure of 0.4 MPa. The total area of broken portions of the coating of the test piece was measured.

EXAMPLE 4

A primer layer (thickness: 25 μm) and a finish coating layer (thickness: 40 μm) were formed on a PP composite material in the same manner as in Example 3 except for using 40 parts of carbon fiber (M-1009F, mfd. by Kureha Chemical Industry Co., Ltd.) in place of the 20 parts of the rock wool and changing the amount of the suspending and orientation-improving agent (DISPARLON 6900-20X, mfd. by Kusumoto Chemicals Ltd.) to 2.0 parts. The adhesive properties of the whole coating to the PP composite material were satisfactory.

As a result of the chipping test, the total area of broken portions of the coating surface was 5 to 10 mm$^2$ per 10,000 mm$^2$ of the coating surface.

EXAMPLE 5

A primer layer (thickness: 25 μm) and a finish coating layer (thickness: 40 μm) were formed on a PP composite material in the same manner as in Example 4 except for using a dispersion of 10 parts of cellulose fiber (AVICEL PH-M15, mfd. by Asahi Chemical Industry Co.) in 10 parts of xylene, in place of 40 parts of the carbon fiber and changing the amount of the suspending and orientation-improving agent (DISPARLON 6900-20X, mfd. by Kusumoto Chemicals Ltd.) to 0.5 part. The adhesive properties of the whole coating to the PP composite material were satisfactory.

As a result of the chipping test, the total area of broken portions of the coating surface was 5 to 10 mm$^2$ per 10,000 mm$^2$ of the coating surface.

COMPARATIVE EXAMPLE 1

A primer layer (thickness: 25 μm) and a finish coating layer (thickness: 40 μm) were formed on a PP composite material in the same manner as in Example 3 except for using 50 parts of titanium oxide having a particle diameter of 0.15 to 0.4 μm in place of 20 parts of the rock wool. The adhesive properties of the whole coating to the PP composite material were satisfactory.

As a result of the chipping test, the total area of broken portions of the coating surface was 20 to 25 mm$^2$ per 10,000 mm$^2$ of the coating surface.

EXAMPLE 6

A dispersion of 21 parts of aluminum powder (Aluminum Paste SAP 630N, mfd. by Syowa Aluminum Corp.) in 21 parts of xylene, and 1.2 parts of a suspending and orientation-improving agent (DISBARON 6900-20X, mfd. by Kusumoto Chemicals Ltd.) were added to the 100 parts of the same acrylic copolymer as used in Example 3, with stirring by means of a dissolver, to prepare a liquid, A.

On the other hand, 100 parts of a chlorinated polyolefin resin (HARDREN 15L, mfd. by Toyokasei Kogyo Co., Ltd.), 10 parts of an epoxy compound (DENACOL Ex421, mfd. by Nagase & Co., Ltd.) and 100 parts of toluene were stirred together to prepare a liquid, B.

The liquid A and the liquid B were mixed in a ratio of 2:1 (by weight), and 4 parts of toluene, 40 parts of xylene and 20 parts of cyclohexane were added to adjust the viscosity of the resulting mixture so that the time measured by means of a Ford cup No. 4 might be 13 to 14 seconds. The coating fluid thus obtained was applied by spraying on a PP composite material (PP resin/talc/EPDM resin), dried by heating at 60° C. for 20 minutes, and then allowed to stand at room temperature (20° C.) for 10 to 30 minutes to form a primer layer of 25 μm in thickness.

Then, a finish coating fluid (SOFLEX 200, a thermosetting urethane paint mfd. by Kansai Paint Co., Ltd.) was applied on the primer layer, and dried and baked at 85° C. for 40 minutes to form a finish coating layer of 40 μm in thickness.

The adhesive properties of the whole coating to the PP composite material were satisfactory.

The PP composite material on which the primer layer and the finish coating layer had been formed was subjected to the chipping test. Consequently, the total area of broken portions of the coating surface of the coated PP composite material was 1 to 5 mm² per 10,000 mm² of the coating surface.

EXAMPLE 7

A primer layer (thickness: 25 μm) and a finish coating layer (thickness: 40 μm) were formed on a PP composite material in the same manner as in Example 6 except for using 40 parts of stainless steel powder (Stainless Steel FLAKEFIN, mfd. by Novamet) in place of the dispersion of the aluminum powder in xylene and changing the amount of the suspending and orientation-improving agent (DISPARLON 6900-20X, mfd. by Kusumoto Chemicals Ltd.) to 2.0 parts. The adhesive properties of the whole coating to the PP composite material were satisfactory.

As a result of the chipping test, the total area of broken portions of the coating surface was 5 to 10 mm² per 10,000 mm² of the coating surface.

EXAMPLE 8

A primer layer (thickness: 25 μm) and a finish coating layer (thickness: 40 μm) were formed on a PP composite material in the same manner as in Example 6 except for using 10 parts of mica powder (PEARL GLAZE ME-100, mfd. by Nihon Koken Kogyo, K.K.) in place of the dispersion of the aluminum powder in xylene and changing the amount of the suspending and orientation-improving agent (DISPARLON 6900-20X, mfd. by Kusumoto Chemicals Ltd.) to 1.0 part. The adhesive properties of the whole coating to the PP composite material were satisfactory.

As a result of the chipping test, the total area of broken portions of the coating surface was 5 to 10 mm² per 10,000 mm² of the coating surface.

COMPARATIVE EXAMPLE 2

A primer layer (thickness: 25 μm) and a finish coating layer (thickness: 40 μm) were formed on a PP composite material in the same manner as in Example 6 except for using 50 parts of titanium oxide in place of the dispersion of the aluminum powder in xylene. The adhesive properties of the whole coating to the PP composite material were satisfactory.

As a result of the chipping test, the total area of broken portions of the coating surface was 20 to 25 mm² per 10,000 mm² of the coating surface.

EXAMPLE 9

A further example in which the resin molded article of the present invention was made into a rocker molding for an automobile is explained below with reference to FIGS. 12 to 18.

Figure 12:
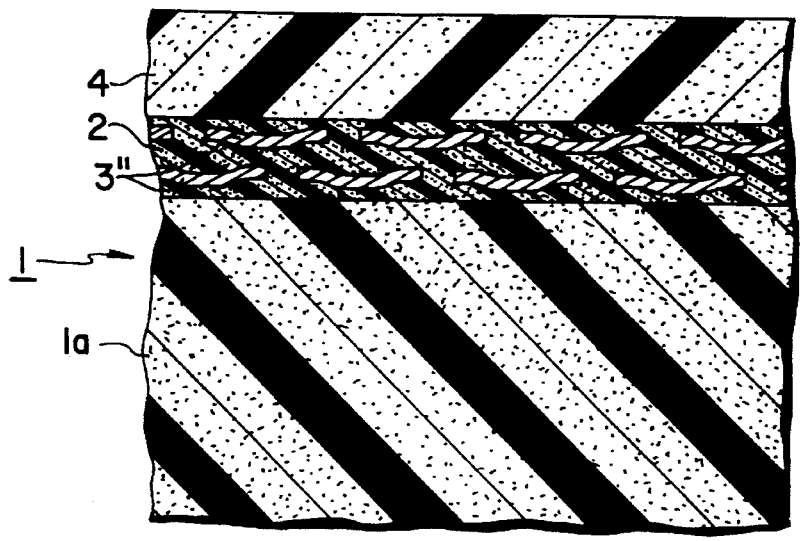
FIG. 12 is a partially sectional view of a rocker molding according to another embodiment of the present invention wherein scaly pieces of matter are present in the intermediate coating layer.
Figure 13:
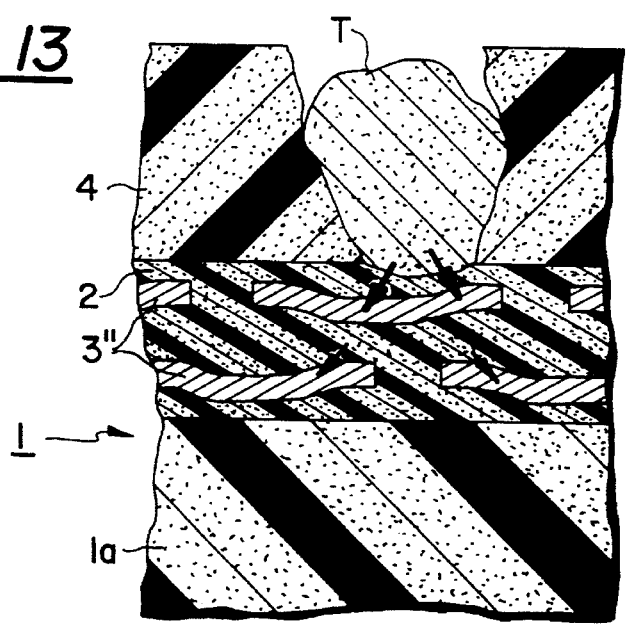
FIG. 13 is an enlarged sectional view showing a state of collision of a flying projectile, for example, a stone, with the rocker molding in the embodiment depicted in FIG. 12.
Figure 14:
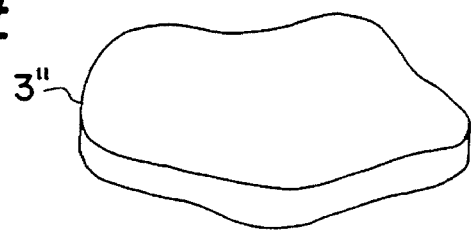
FIG. 14 is a schematic perspective view of the scaly piece of matter according to the embodiment depicted in FIG. 12.
Figure 15:
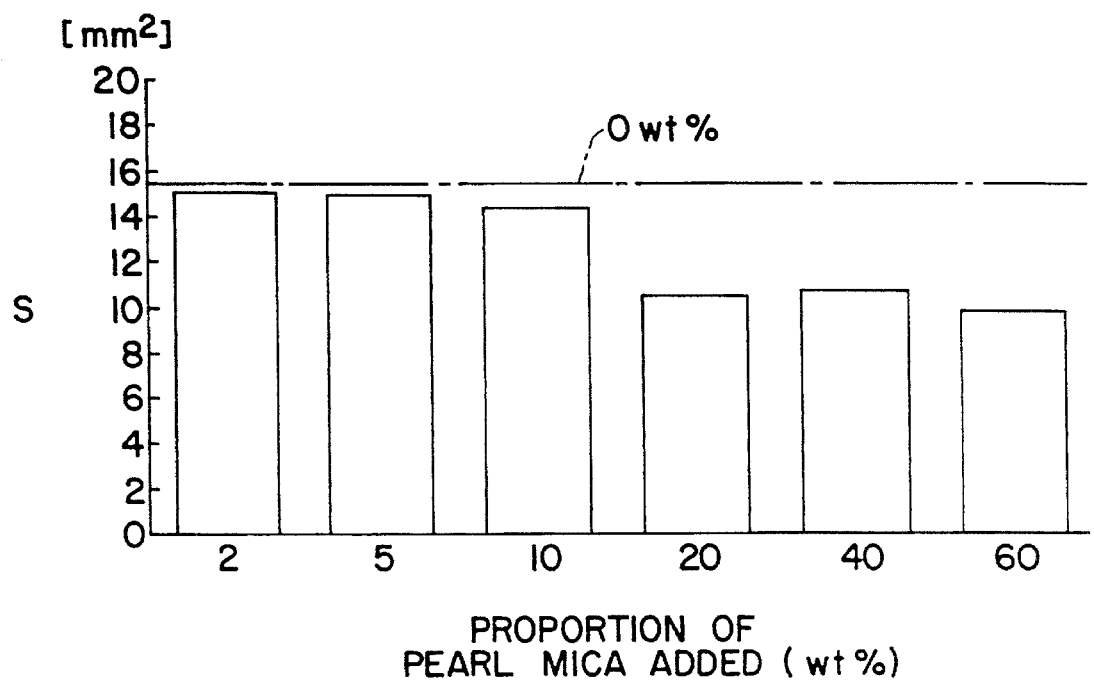
FIG. 15 is a graph showing the total area (mm²) of broken portions of the coating layer of the rocker molding surface versus the wt % of added pearl mica in the intermediate coating layer for the case of projection of flying stones at an angle of 90°.
Figure 16:
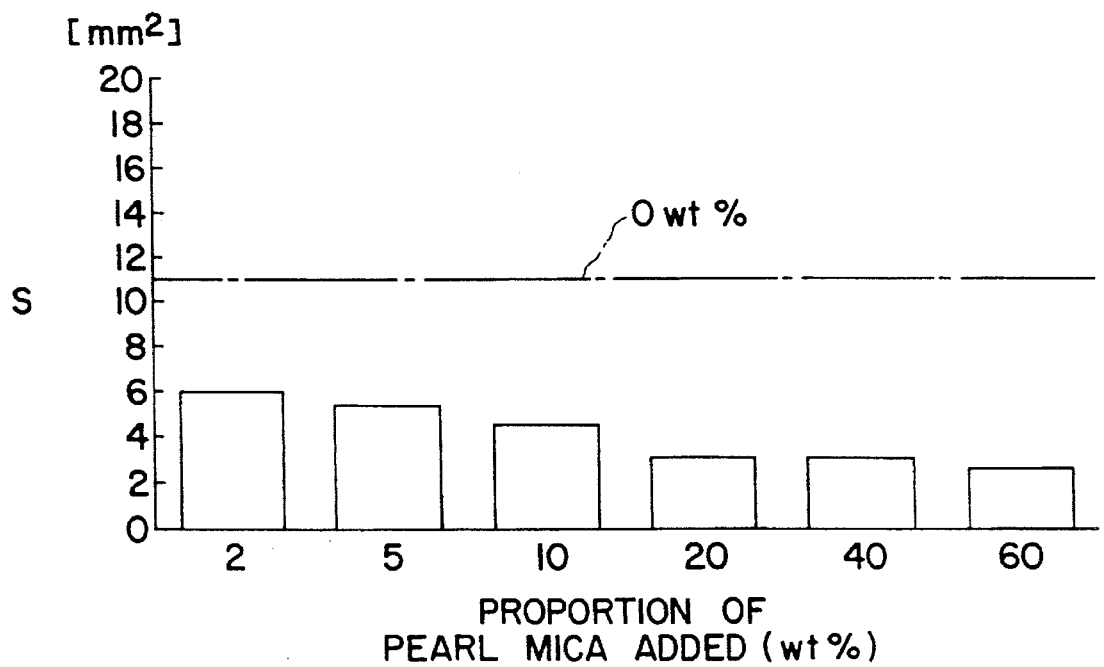
FIG. 16 is a graph showing the total area (mm²) of broken portions of the coating layer of the rocker molding surface versus the wt % of added pearl mica in the intermediate coating layer for the case of projection of flying stones at an angle of 20°.
Figure 17:
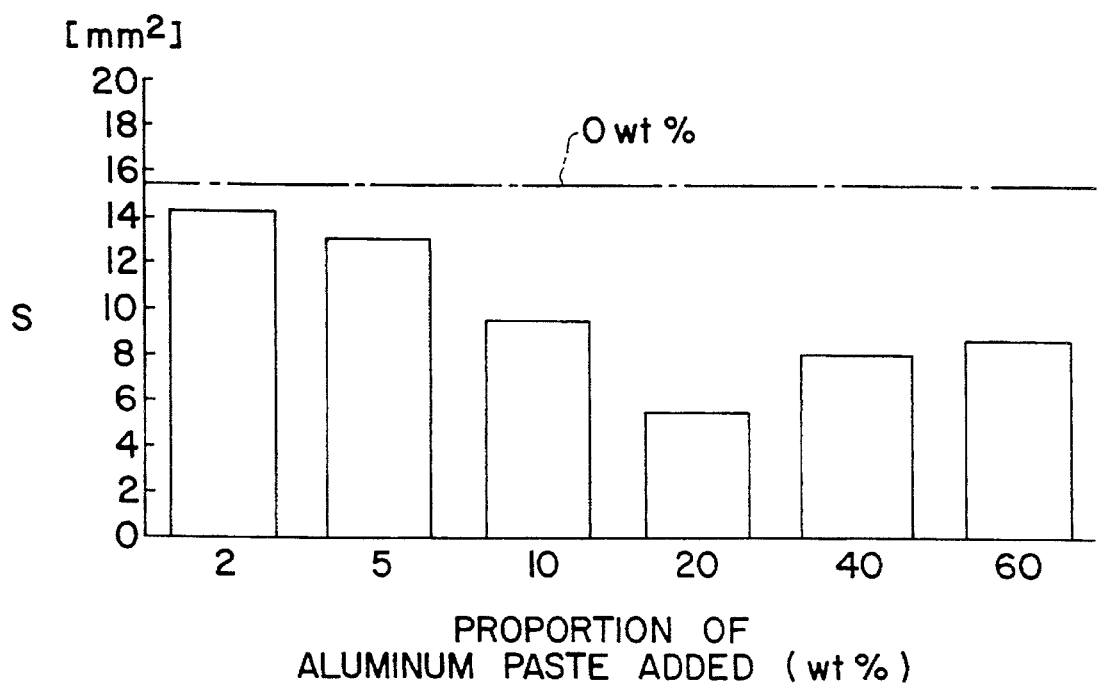
FIG. 17 is a graph showing the total area (mm²) of broken portions of the coating layer of the rocker molding surface versus the wt % of added aluminum paste in the intermediate coating layer for the case of projection of flying stones at an angle of 90°.
Figure 18:
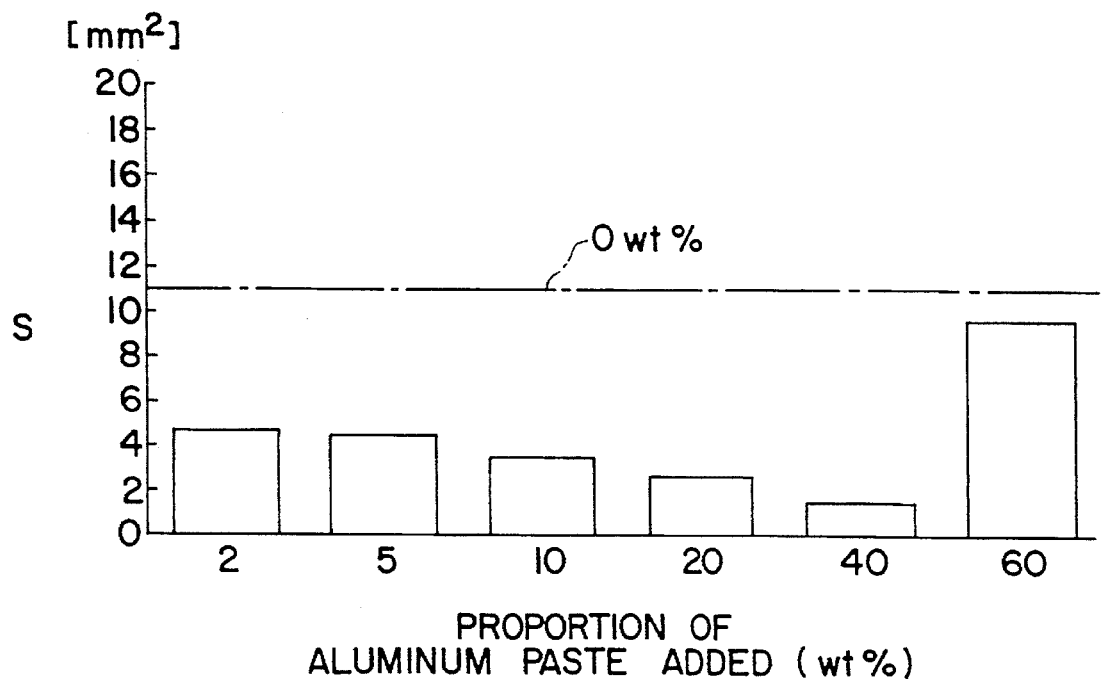
FIG. 18 is a graph showing the total area (mm²) of broken portions of the coating layer of the rocker molding surface versus the wt % of added aluminum paste in the intermediate coating layer for the case of projection of flying stones at an angle of 20°.

FIG. 12 is a partially sectional view of the rocker molding, 1, of the present example. The rocker molding, 1, is composed of a main body of the molding, 1a, as a main body of the molded article, a primer layer, 2, formed as an intermediate coating layer on the surface of the main body of the molding, 1a, and a finish coating layer formed on the surface of the primer layer, 2.

The primer layer, 2, is composed of a resin constituent consisting of an amine-modified acrylic resin, a hard resin, pigments, additives, an epoxy resin and a chlorinated polypropylene, and a large number of scaly pieces of matter, 3", added in a proportion of not more than 60 wt % and not less than 2 wt % based on the weight of the resin constituent. The primer layer had a thickness of 25 μm. The finish coating layer, 4, was formed to a thickness of 35 μm by the application and drying of a finish coating fluid (SOFLEX 200, a trade name, thermosetting urethane coating mfd. by Kansai Paint Co., Ltd.).

The primer layer, 2, and finish coating layer, 4, were formed in the following manner. First, there was prepared a liquid primer composed of 100 parts by weight of a liquid, A, consisting of an amine-modified acrylic resin, a hard resin, pigments, additives, a large number of the scaly pieces of matter, 3", and a solvent; 50 parts by weight of a liquid, B, consisting of epoxy resin, chlorinated polypropylene and a solvent; and 100 parts by weight of an aromatic thinner. The primer was applied on the surface of the main body of the molding, 1a. Subsequently, the finish coating fluid was applied on the primer and dried. Then, baking was accomplished at a high temperature of 85° C. for 40 minutes. Thus, the primer layer, 2, and the finish coating layer, 4, were laminated on the main body of molding, 1a, whereby the desired rocker molding, 1, was obtained.

When the rocker molding, 1, having the structure described above is attached to an automobile and the automobile is driven in practice, a flying object, such as a stone, T, may collide with the rocker molding, 1, at a high speed, threatening the destruction of a part of the finish coating layer, 4, which could reach the primer layer, 2, as shown in FIG. 2. According to the present invention, however, the primer layer, 2, contains a large number of the scaly pieces of matter, 3", which provides protection from the great impact forces which would otherwise be applied to the primer layer if the scaly pieces of matter were not present in the area of impact to disperse the otherwise damaging force. Therefore, in the present invention, only weak impact forces are applied to the unit area of the main body of rocker molding, 1a. Accordingly, the coating layer composed of the primer layer, 2, and the finish coating layer, 4, experiences little peeling or other damage resulting from impact forces from flying objects such as flying stores, and the main body of rocker molding, 1a, is spared, providing a more durable product.

To confirm the superior resistance to chipping of the above, scaly pieces of matter, 3", added to the primer layer, 2, and the amount thereof were varied as follows. As the scaly piece of matter 3", there was used each of pearl mica (PEARL GLAZE ME-100, a trade name, mfd. by Nihon Koken Kogyo, K.K.; size 10 to 60 μm having an aspect ratio (average particle diameter/ average particle thickness) of 84). The aspect ratio is preferably 3 to 90 from the viewpoint of the ease of orientation of the scaly pieces and the reduction of the surface roughness of the final product. The following 7 proportions of scaly pieces were employed: 0 wt %, 2 wt %, wt %, 10 wt %, 20 wt %, 40 wt % and 60 wt %, based on the weight of the resin constituent which constituted the primer.

A flying-stone collision test was carried out in the same manner as in Example 1.

The measurement results obtained are shown in FIGS. 15 to 18. In each of these figures, the alternate long and short dash line shows the total area S (mm²) of broken portions of the coating, in the case where the proportion of the scaly pieces of matter added was 0 wt %.

As is clear from these figures, in the case of both the 90° projection and the 20° projection, the higher the adding proportion of the scaly pieces of matter, 3'', the smaller the total area S (mm$^2$) of the coating which is damaged, when the proportion added was 2 wt % or more based on the weight of the resin constituent of the primer.

In the rocker molding, 1, of the present embodiment of the instant invention, the scaly pieces of matter, 3'', are added to the primer layer, 2, in a proportion of not more than 60 wt % and not less than 2 wt % based on the weight of the resin constituent which constitutes the primer layer.

The present invention is not limited to the above example and can be conducted, for example, as follows. Although each of pearl mica and aluminum paste were used in the above example, scaly pieces of metals, wood chips, resin materials, and the like may also be used without departing from the scope of the present invention. Further, although the intermediate coating layer was composed of one layer, i.e., the primer layer, 2, in the above example, the intermediate coating layer may be composed of a plurality of layers.

EXAMPLE 10

The experiment described in Example 9 was repeated, except that the resin constituent consisted of a polyester resin, pigments, additives, a polyisocyanate compound and a chlorinated polypropylene; the scaly piece of matter was finely powdered mica (aspect ratio =5 to 10, size: about 1 µm); the amount of the scaly pieces of matter added was 20 wt % based on the weight of the resin constituent; the primer was composed of 100 parts by weight of a liquid, A, consisting of the above-mentioned resin constituent and finely powdered mica and a solvent and 75 parts by weight of an aromatic thinner; and the thickness of the finish coating layer was 30 µm.

The following table summarizes the results of measuring the total area S (mm$^2$) of broken portions of the coating in relation to the proportion of the scaly pieces of matter added relative to the resin constituent of the primer, in the case of 90° projection and 20° projection of stone.

| Adding proportion | 20° projection | 90° projection |
|---|---|---|
| 0 wt% | 7.0 | 25 |
| 20 wt% | 0.8 | 3.2 |

Japanese Patent Application Nos. 4-109487, 4-109488, 4-109489, 4-134438 and 4-134439:

All publications mentioned hereinabove are hereby incorporated in their entirety by reference.

While the foregoing invention has been described in some detail for purposes of clarify and understanding, it will be appreciated by one skilled in the art from a reading of this disclosure that various changes in form and detail can be made without departing from the true scope of the present invention and appended claims.

What is claimed is:

1. A resin molded article comprising a main body of resin molded material, an intermediate coating layer, comprising a resin constituent which resin constituent comprises a mixture of an amine-modified acrylic resin, an epoxy compound having at least two epoxy groups said epoxy compound selected from the group consisting of bisphenol A and glycidyl ether of a polyhydric alcohol and a chlorinated polyolefin having a chlorine content of 20% to 40% and scaly pieces of matter in an amount of 2% to 60% based on said resin constituent which scaly pieces of matter have a particle diameter of 1 to 300 µm and an aspect ratio of 3 to 150 and are oriented parallel to the surface of said main body, and a finish coating layer formed on the outermost surface of said intermediate coating layer.

2. The coated resin molded article according to claim 1, wherein the aspect ratio of said scaly pieces of matter is 3 to 90.

3. The coated resin molded article according to claim 1, wherein said scaly pieces of matter comprise at least one member selected from the group consisting of mica, aluminum, stainless steel, nickel, glass and talc.

4. The coated resin molded article according to claim 1, wherein the intermediate coating layer further comprises a plurality of such layers.

* * * * *